US011866068B2

(12) United States Patent
Silver et al.

(10) Patent No.: US 11,866,068 B2
(45) Date of Patent: Jan. 9, 2024

(54) DETECTING AND RESPONDING TO MALFUNCTIONING TRAFFIC SIGNALS FOR AUTONOMOUS VEHICLES

(71) Applicant: Waymo LLC, Mountain View, CA (US)

(72) Inventors: David Silver, San Carlos, CA (US); Carl Kershaw, San Francisco, CA (US); Jonathan Hsiao, Palo Alto, CA (US); Edward Hsiao, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 486 days.

(21) Appl. No.: 16/906,594

(22) Filed: Jun. 19, 2020

(65) Prior Publication Data

US 2021/0397827 A1 Dec. 23, 2021

(51) Int. Cl.
*B60W 60/00* (2020.01)
*G08G 1/095* (2006.01)
*G06V 40/10* (2022.01)
*G06V 20/58* (2022.01)
*G06F 18/24* (2023.01)

(52) U.S. Cl.
CPC .... *B60W 60/0015* (2020.02); *B60W 60/0025* (2020.02); *G06F 18/24* (2023.01); *G06V 20/584* (2022.01); *G06V 40/10* (2022.01); *G08G 1/095* (2013.01); *B60W 2554/408* (2020.02); *B60W 2554/4029* (2020.02)

(58) Field of Classification Search
CPC . G06V 40/10; G06V 20/584; B60W 60/0015; B60W 60/0025; B60W 2554/4029; B60W 2554/408; G06K 9/6267; G08G 1/095
USPC ......................................................... 382/104
See application file for complete search history.

(56) References Cited

U.S. PATENT DOCUMENTS

| 8,576,069 | B2 | 11/2013 | Nadeem et al. |
| 9,272,709 | B2 | 3/2016 | Ben Shalom |
| 9,707,960 | B2 | 7/2017 | Gutmann et al. |
| 2017/0192437 | A1* | 7/2017 | Bier ..................... G05D 1/0077 |
| 2018/0082134 | A1* | 3/2018 | Sivaraman ............. G06V 20/56 |
| 2018/0253968 | A1* | 9/2018 | Yalla ....................... G08G 1/097 |
| 2019/0272748 | A1* | 9/2019 | Cross ..................... G08G 1/087 |

(Continued)

OTHER PUBLICATIONS

"Waymo's self-driving car navigates a police controlled intersection," Video screen shots of Waymo YouTube channel video downloaded on Jul. 23, 2020, pp. 1-19.

(Continued)

*Primary Examiner* — Jacob S. Scott
*Assistant Examiner* — Michael E Butler
(74) *Attorney, Agent, or Firm* — Botus Churchill IP Law LLP (57) ABSTRACT

Aspects of the disclosure relate to detecting and responding to malfunctioning traffic signals for a vehicle having an autonomous driving mode. For instance, information identifying a detected state of a traffic signal for an intersection. An anomaly for the traffic signal may be detected based on the detected state and prestored information about expected states of the traffic signal. The vehicle may be controlled in the autonomous driving mode based on the detected anomaly.

21 Claims, 10 Drawing Sheets

(56) References Cited

U.S. PATENT DOCUMENTS

2020/0081448 A1* 3/2020 Creusot ................ G06V 10/82

OTHER PUBLICATIONS

Alistair Charlton, Waymo driverless cars now understand hand signals from police officers, https://www.salon.com/2019/02/25/waymo-driverless-cars-now-understand-hand-signals-from-police-officers_partner/, retrieved from internet Apr. 17, 2020, pp. 1-2.
Ira Boudway, Someday Your Self-Driving Car Will Pull Over for Police, https://www.bloomberg.com/news/features/2019-02-20/someday-your-self-driving-car-will-pull-over-for-police. retrieved from internet on Apr. 17, 2020, pp. 1-7.
Jake Holmes, Waymo self-driving cars can now respond to traffic cops' hand signals, https://www.cnet.com/roadshow/news/waymo-self-driving-cars-police-officer-gestures/, retrieved from internet on Apr. 17, 2020, pp. 1-3.
Jesse Levinson, Traffic Light Mapping, Localization, and State Detection for Autonomous Vehicles, pp. 1-8. Jun. 19, 2020.

* cited by examiner

DETECTING AND RESPONDING TO MALFUNCTIONING TRAFFIC SIGNALS FOR AUTONOMOUS VEHICLES

BACKGROUND

Autonomous vehicles, such as vehicles which do not require a human driver when operating in an autonomous driving mode, may be used to aid in the transport of passengers or items from one location to another. An important component of an autonomous vehicle is the perception system, which allows the vehicle to perceive and interpret its surroundings using sensors such as cameras, radar, LIDAR sensors, and other similar devices. For instance, the perception system and/or the vehicle's computing devices may process data from these sensors in order to identify objects as well as their characteristics such as location, shape, size, orientation, heading, acceleration or deceleration, type, etc. This information is critical to allowing the vehicle's computing systems to make appropriate driving decisions for the vehicle.

SUMMARY

Aspects of the disclosure provide a method of controlling a vehicle in an autonomous driving mode. The method includes receiving, by one or more processors, information identifying a detected state of a traffic signal for an intersection; detecting, by the one or more processors, an anomaly for the traffic signal based on the detected state and prestored information about expected states of the traffic signal; and controlling, by the one or more processors, the vehicle in the autonomous driving mode based on the detected anomaly.

In one example, the information further identifies a detected location of the traffic signal, and detecting the anomaly is further based on the detected location. In another example, the method also includes receiving information about behavior of another object in an environment of the vehicle, and detecting the anomaly is further based on the behavior. In another example, detecting the anomaly is further based on whether the vehicle is within a threshold distance of the traffic signal where a state of the traffic signal should be detected. In this example, detecting the anomaly is further based on a failure to detect the state of the traffic signal when the vehicle is within the threshold distance. In addition, detecting the anomaly is further based on whether there are occlusions between the vehicle and the traffic signal. In addition or alternatively, the threshold distance is closer in distance or time to the traffic signal than a perceptive range of a system of the vehicle configured to detect a state of the traffic signal. In another example, detecting the anomaly is further based on whether the vehicle has observed a same state of the traffic signal for more than a threshold period of time. In this example, the method also includes selecting the threshold period of time based on the detected state. In this example, detecting the anomaly is further based on observed behaviors of other vehicles. In another example, the method also includes receiving information about behavior of another object in an environment of the vehicle and classifying the detected anomaly is further based on the behavior, and the controlling is further based on the classification. In another example, the method also includes classifying the anomaly based on the detected state, and the controlling is further based on the classification. In another example, the method also includes classifying the anomaly based on whether the vehicle has observed a same state of the traffic signal for more than a threshold period of time, and the controlling is further based on the classification. In another example, controlling the vehicle further includes accessing a mapping of anomaly classifications to vehicle responses and using the classification to determine a response from the mapping. In another example, controlling the vehicle includes stopping at an intersection controlled by the traffic signal. In another example, the method also includes controlling the vehicle includes proceeding through an intersection controlled by the traffic signal without stopping. In another example, the method also includes observing behavior of cross-traffic, and controlling the vehicle is further based on the observed behavior. In another example, controlling the vehicle includes requesting assistance from a remote assistance operator before proceeding. In another example, controlling the vehicle is further based on whether there is a pedestrian directing traffic at an intersection controlled by the traffic signal.

DETAILED DESCRIPTION

Overview

The technology relates to detecting and responding to malfunctioning traffic signals for autonomous vehicles. Nominal traffic signal semantics are clear: the state of the traffic signal (e.g. green, yellow, red, yellow flashing, red flashing) directly indicates how traffic in corresponding lanes should behave. However, sometimes a traffic signal can be malfunctioning or otherwise not operating appropriately. This may be for any number of reasons including, for instance, if the traffic signal has been turned off, has lost power, is covered up, is stuck on yellow or red, or has been reset and is flashing yellow or flashing red. When flashing, it may also not be immediately clear if cross traffic has the same signal. In other words, cross-traffic could have a flashing red light or flashing yellow light.

In each of these cases, such anomalies must be understood by an autonomous vehicle's computing devices in order to allow the autonomous vehicle to proceed properly. The autonomous vehicle's computing devices must be capable of behaving differently in response to different types of anomalies. In addition, the autonomous vehicle's computing devices must be able to differentiate between a true malfunction, or one that is temporary or expected.

In order to determine whether a traffic signal is malfunctioning, an autonomous vehicle's computing devices may utilize a plurality of different inputs. Such inputs may include, for example, the instantaneous detections of traffic signals as published by a traffic signal detection system of the autonomous vehicle. The traffic signal detection system may process camera images and/or sensor data from other sensors in order to detect and identify the location and state of traffic signals including those that are expected at certain locations as defined in detailed map information. In addition to the state and location of a traffic signal, the inputs may also include information about other objects published by a perception system of the vehicle.

The aforementioned inputs may be analyzed using a plurality of heuristics or rules in order to detect an anomaly of a traffic signal. A plurality of these heuristics may be analyzed, and if any of them are met, an anomaly may be detected. As one example, an anomaly may be detected when the detected traffic signal state does not correspond to any expected traffic signal states defined in the map information for that traffic signal. As another example, an anomaly may be detected when the vehicle is within a threshold distance of a traffic signal where the traffic signal detection system should be able to detect a state of a traffic signal and there are no apparent occlusions between the vehicle and the traffic signal. As another example, an anomaly may be detected when the vehicle has observed the traffic signal in the same state for longer than a threshold period of time.

Once an anomaly has been detected, the vehicle's computing devices may determine a type of the anomaly or rather, classify the anomaly. Again, this classification may be performed using a plurality of heuristics or rules. The vehicle's computing devices may then respond to the detected anomaly, for example, based on the classification.

The computing devices of autonomous vehicles may utilize the features described herein all of the time, e.g. each time the traffic signal detection system publishes information in order to detect and respond to malfunctioning traffic signals. However, in almost all cases, the traffic signal detection system will be sufficient for the vehicle to be able to respond to traffic signals. But, in the rare case that a traffic signal is malfunctioning, the output of the traffic signal detection system alone may be insufficient to determine how to best control the vehicle. As such, the features described herein may enable autonomous vehicles to detect and respond to malfunctioning traffic signals. This may not only improve safety of the vehicles, but also reduce the likelihood of these vehicles becoming stuck or unable to make forward progress towards their destination.

Example Systems

Figure 1:
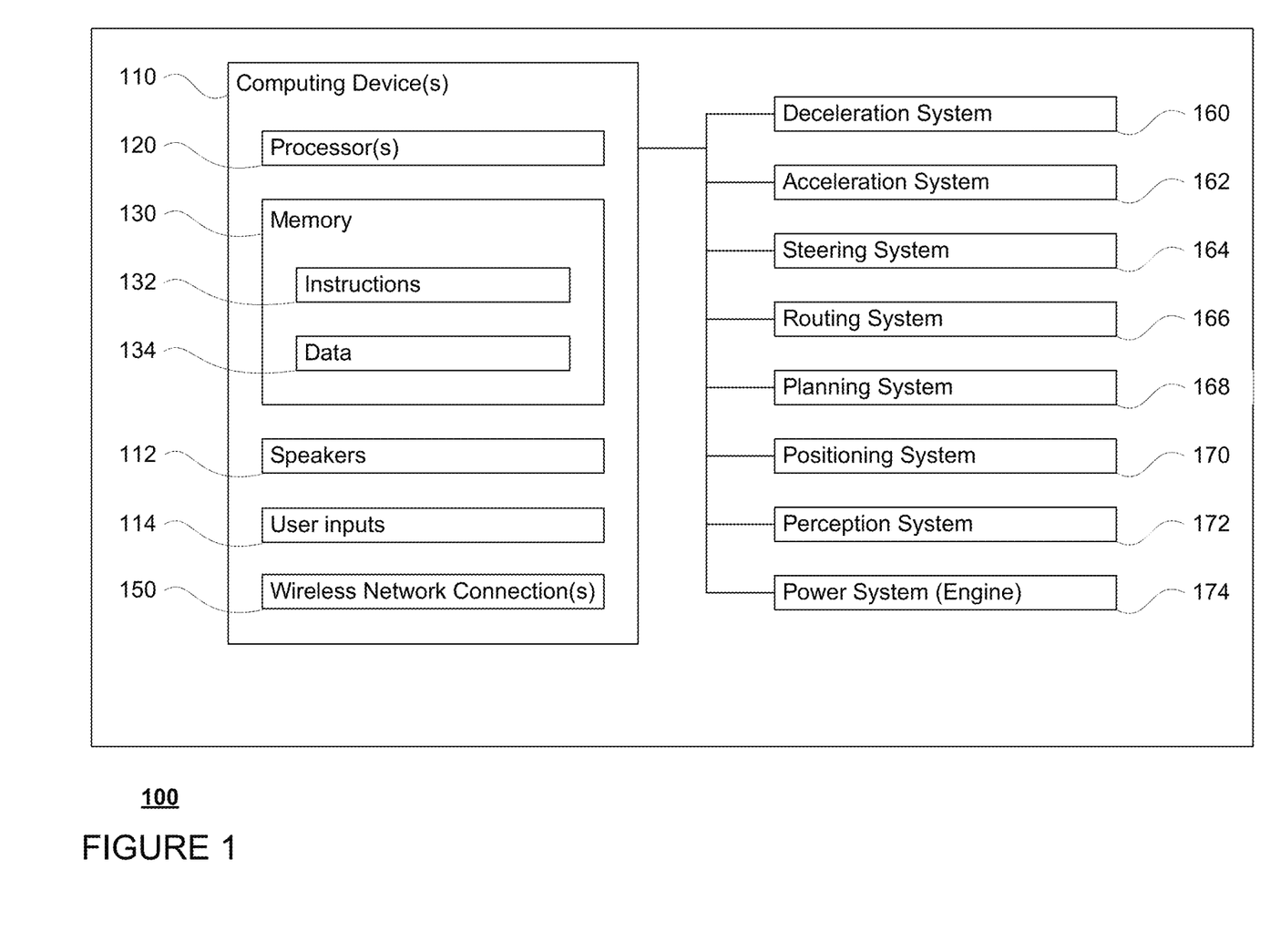
FIG. 1 is a functional diagram of an example vehicle in accordance with aspects of the disclosure.

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs or GPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

The computing devices 110 may also be connected to one or more speakers 112 as well as one or more user inputs 114. The speakers may enable the computing devices to provide audible messages and information, to occupants of the vehicle, including a driver. In some instances, the computing devices may be connected to one or more vibration devices configured to vibrate based on a signal from the computing devices in order to provide haptic feedback to the driver and/or any other occupants of the vehicle. As an example, a vibration device may consist of a vibration motor or one or more linear resonant actuators placed either below or behind one or more occupants of the vehicle, such as embedded into one or more seats of the vehicle.

The user input may include a button, touchscreen, or other devices that may enable an occupant of the vehicle, such as a driver, to provide input to the computing devices 110 as described herein. As an example, the button or an option on the touchscreen may be specifically designed to cause a transition from the autonomous driving mode to the manual driving mode or the semi-autonomous driving mode.

In one aspect the computing devices 110 may be part of an autonomous control system capable of communicating with various components of the vehicle in order to control the vehicle in an autonomous driving mode. For example, returning to FIG. 1, the computing devices 110 may be in communication with various systems of vehicle 100, such as deceleration system 160, acceleration system 162, steering system 164, routing system 166, planning system 168, positioning system 170, and perception system 172 in order to control the movement, speed, etc. of vehicle 100 in accordance with the instructions 132 of memory 130 in the autonomous driving mode. In this regard, each of these systems may include one or more processors, memory, data and instructions. Such processors, memories, instructions and data may be configured similarly to one or more processors 120, memory 130, instructions 132, and data 134 of computing device 110.

As an example, computing devices 110 may interact with deceleration system 160 and acceleration system 162 in order to control the speed of the vehicle. Similarly, steering system 164 may be used by computing devices 110 in order to control the direction of vehicle 100. For example, if vehicle 100 is configured for use on a road, such as a car or truck, the steering system may include components to control the angle of wheels to turn the vehicle.

Planning system 168 may be used by computing devices 110 in order to determine and follow a route generated by a routing system 166 to a location. For instance, the routing system 166 may use map information to determine a route from a current location of the vehicle to a drop off location. The planning system 168 may periodically generate trajectories, or short-term plans for controlling the vehicle for some period of time into the future, in order to follow the route (a current route of the vehicle) to the destination. In this regard, the planning system 168, routing system 166, and/or data 134 may store detailed map information, e.g., highly detailed maps identifying the shape and elevation of roadways, lane lines, intersections, crosswalks, speed limits, traffic signals, buildings, signs, real time traffic information, vegetation, or other such objects and information. In addition, the map information may identify area types such as constructions zones, school zones, residential areas, parking lots, etc.

The map information may include one or more roadgraphs or graph networks of information such as roads, lanes, intersections, and the connections between these features which may be represented by road segments. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Figure 2:
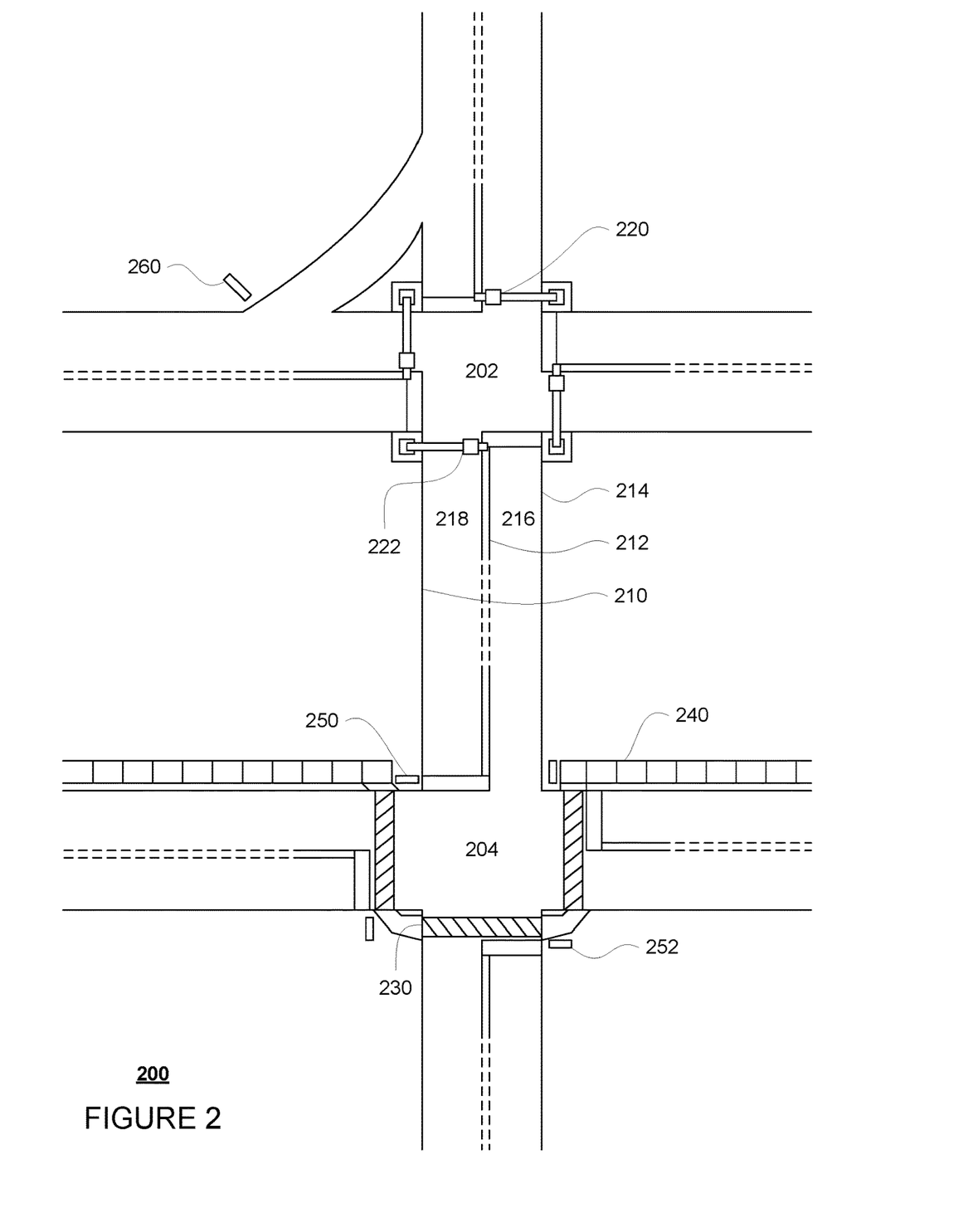
FIG. 2 is an example of map information in accordance with aspects of the disclosure.

FIG. 2 is an example of map information 200 for a section of roadway including intersections 202 and 204. The map information 200 may be a local version of the map information stored in the memory 130 of the computing devices 110. Other versions of the map information may also be stored in the storage system 450 discussed further below. In this example, the map information 200 includes information identifying the shape, location, and other characteristics of lane lines 210, 212, 214 which define lanes 216, 218, traffic signals 220, 222, stop line 224, crosswalk 230, sidewalks 240, stop signs 250, 252, and yield sign 260. In this regard, the map information includes the three-dimensional (3D) locations of traffic signals 220, 222 as well as information identifying the lanes which are controlled by these traffic signals.

In some examples, the map information may identify additional information about traffic signals. This information may include, for example, expected states and durations (e.g. how long should a green, yellow or red light last) as well as information identifying which lanes the traffic signal controls. In this regard, the map information may store expected states and durations for traffic signals 220, 222 as well as information indicating that these traffic signals control lanes 216, 218, respectively.

While the map information may be an image-based map, the map information need not be entirely image based (for example, raster). For example, the map information may include one or more roadgraphs or graph networks of information such as roads, lanes, intersections represented as nodes, and the connections between these features which may be represented by road segments. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Positioning system 170 may be used by computing devices 110 in order to determine the vehicle's relative or absolute position on a map and/or on the earth. The positioning system 170 may also include a GPS receiver to determine the device's latitude, longitude and/or altitude position relative to the Earth. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 170 may also include other devices in communication with the computing devices of the computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The perception system 172 also includes one or more components for detecting objects external to the vehicle such as other vehicles, obstacles in the roadway, traffic signals, signs, trees, etc. For example, the perception system 172 may include lasers, sonar, radar, cameras and/or any other detection devices that record data which may be processed by the computing devices of the computing devices 110. In the case where the vehicle is a passenger vehicle such as a minivan, the minivan may include a laser or other sensors mounted on the roof or other convenient location.

Figure 3:
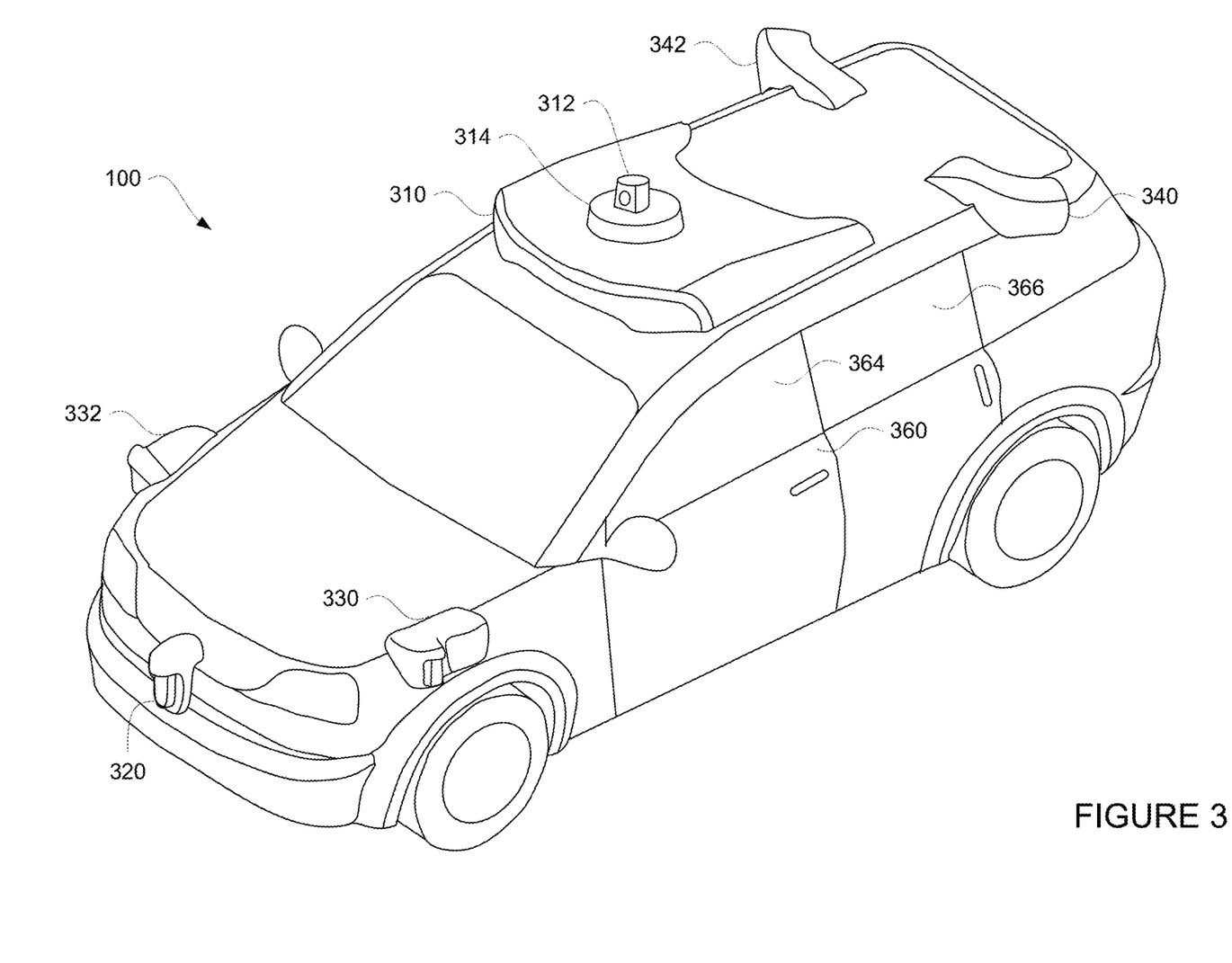
FIG. 3 is an example diagram of a vehicle in accordance with aspects of the disclosure.

For instance, FIG. 3 is an example external view of vehicle 100. In this example, roof-top housing 310 and roof-top housings 312, 314 may include a LIDAR sensor as well as various cameras and radar units. In addition, housing 320 located at the front end of vehicle 100 and housings 330, 332 on the driver's and passenger's sides of the vehicle may each store a LIDAR sensor. For example, housing 330 is located in front of doors 360, 362 which also include windows 364, 366. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or roof-top housing 310.

The computing devices 110 may be capable of communicating with various components of the vehicle in order to control the movement of vehicle 100 according to primary vehicle control code of memory of the computing devices 110. For example, returning to FIG. 1, the computing devices 110 may include various computing devices in communication with various systems of vehicle 100, such as deceleration system 160, acceleration system 162, steering system 164, routing system 166, planning system 168, positioning system 170, perception system 172, and power system 174 (i.e. the vehicle's engine or motor) in order to control the movement, speed, etc. of vehicle 100 in accordance with the instructions 132 of memory 130.

The various systems of the vehicle may function using autonomous vehicle control software in order to determine how to and to control the vehicle. As an example, a perception system software module of the perception system 172 may use sensor data generated by one or more sensors of an autonomous vehicle, such as cameras, LIDAR sensors, radar units, sonar units, etc., to detect and identify objects and their features. These features may include location, type, heading, orientation, speed, acceleration, change in acceleration, size, shape, etc. In some instances, features may be input into a behavior prediction system software module which uses various behavior models based on object type to output a predicted future behavior for a detected object.

In other instances, the features may be put into one or more detection system software systems or modules, such as a traffic signal detection system software module configured to detect the states of known traffic signals, a school bus detection system software module configured to detect school busses, construction zone detection system software module configured to detect construction zones, a detection system software module configured to detect one or more persons (e.g. pedestrians) directing traffic, a traffic accident detection system software module configured to detect a traffic accident, an emergency vehicle detection system configured to detect emergency vehicles, etc. These detection system software modules may be incorporated into the perception system 172 or the computing devices 110. Each of these detection system software modules may input sensor data generated by the perception system 172 and/or one or more sensors (and in some instances, map information for an area around the vehicle) into various models which may output a likelihood of a certain traffic signal state, a likelihood of an object being a school bus, an area of a construction zone, a likelihood of an object being a person directing traffic, an area of a traffic accident, a likelihood of an object being an emergency vehicle, etc., respectively. These systems may rely on a combination of heuristics and machine learning.

Detected objects, predicted future behaviors, various likelihoods from detection system software modules, the map information identifying the vehicle's environment, position information from the positioning system 170 identifying the location and orientation of the vehicle, a destination for the vehicle as well as feedback from various other systems of the vehicle may be input into a planning system software module of the planning system 168. The planning system may use this input to generate trajectories for the vehicle to follow for some brief period of time into the future based on a current route of the vehicle generated by a routing module of the routing system 166. A control system software module of the computing devices 110 may be configured to control movement of the vehicle, for instance by controlling braking, acceleration and steering of the vehicle, in order to follow a trajectory.

Computing devices 110 may also include one or more wireless network connections 150 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

The computing devices 110 may control the vehicle in an autonomous driving mode by controlling various components. For instance, by way of example, the computing devices 110 may navigate the vehicle to a destination location completely autonomously using data from the detailed map information and planning system 168. The computing devices 110 may use the positioning system 170 to determine the vehicle's location and perception system 172 to detect and respond to objects when needed to reach the location safely. Again, in order to do so, computing device 110 may generate trajectories and cause the vehicle to follow these trajectories, for instance, by causing the vehicle to accelerate (e.g., by supplying fuel or other energy to the engine or power system 174 by acceleration system 162), decelerate (e.g., by decreasing the fuel supplied to the engine or power system 174, changing gears, and/or by applying brakes by deceleration system 160), change direction (e.g., by turning the front or rear wheels of vehicle 100 by steering system 164), and signal such changes (e.g. by using turn signals). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Figure 4:
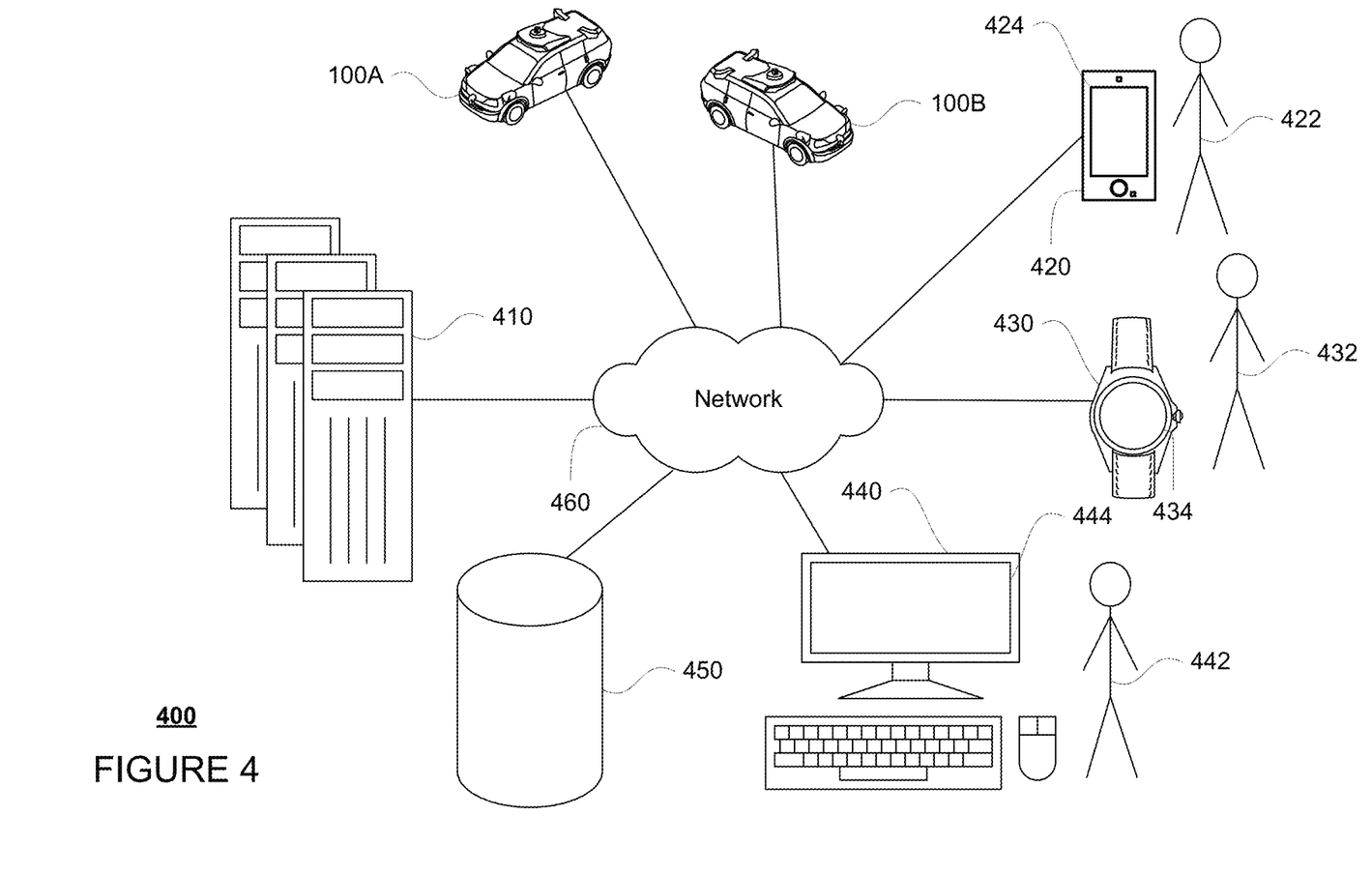
FIG. 4 is an example pictorial diagram of a system in accordance with aspects of the disclosure.

Computing device 110 of vehicle 100 may also receive or transfer information to and from other computing devices, such as those computing devices that are a part of the transportation service as well as other computing devices. FIGS. 3 and 4 are pictorial and functional diagrams, respectively, of an example system 400 that includes a plurality of computing devices 410, 420, 430, 440 and a storage system 450 connected via a network 460. System 400 also includes vehicle 100, and vehicles 100A, 100B which may be configured the same as or similarly to vehicle 100. Although only a few vehicles and computing devices are depicted for simplicity, a typical system may include significantly more.

As shown in FIG. 4, each of computing devices 410, 420, 430, 440 may include one or more processors, memory, instructions and data. Such processors, memories, data and instructions may be configured similarly to one or more processors 120, memory 130, instructions 132 and data 134 of computing device 110.

The network 460, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 410 may include one or more server computing devices having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with computing device 110 of vehicle 100 or a similar computing device of vehicle 100A as well as computing devices 420, 430, 440 via the network 460. For example, vehicles 100, 100A, may be a part of a fleet of vehicles that can be dispatched by server computing devices to various locations. In this regard, the server computing devices 410 may function as a validation computing system which can be used to validate autonomous control software which vehicles such as vehicle 100 and vehicle 100A may use to operate in an autonomous driving mode. In addition, server computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 4, each client computing device 420, 430, 440 may be a personal computing device intended for use by a user 422, 432, 442, and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touchscreen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430, and 440 may each comprise a full-sized personal computing device, they may alternatively comprise client computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, depicted as a smart watch as shown in FIG. 4. As an example the user may input information using a small keyboard, a keypad, microphone, using visual signals with a camera, or a touch screen.

Figure 5:
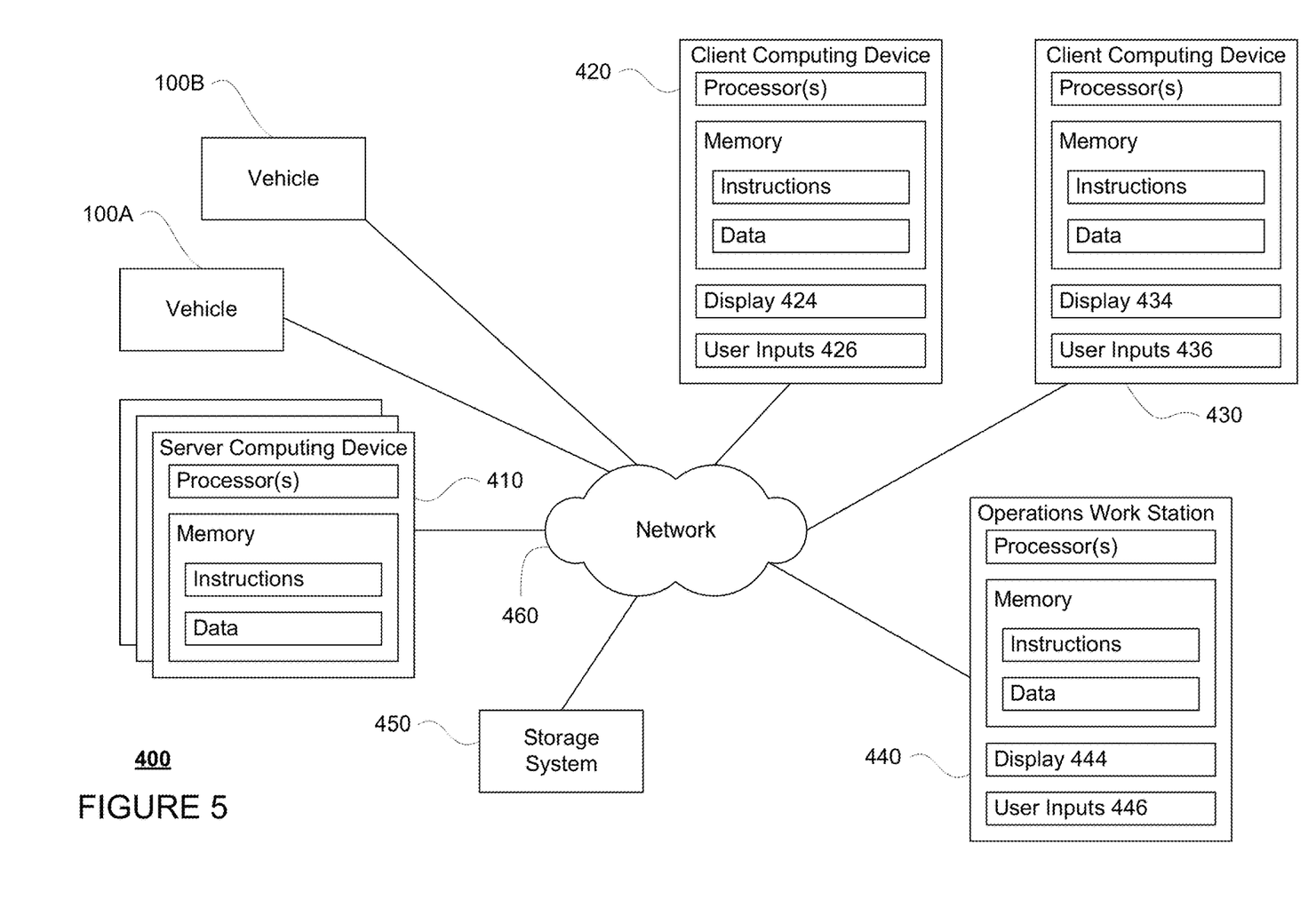
FIG. 5 is an example functional diagram of a system in accordance with aspects of the disclosure.

In some examples, client computing device 420 may be a mobile phone used by passenger of a vehicle. In other words, user 422 may represent a passenger. In addition, client communication device 430 may represent a smart watch for a passenger of a vehicle. In other words, user 432 may represent a passenger. The client communication device 430 may represent a workstation for an operations person, for example, a remote assistance operator or someone who may provide remote assistance to a vehicle and/or a passenger. In other words, user 442 may represent a remote assistance operator. Although only a few passengers and operations person are shown in FIGS. 4 and 5, any number of such, passengers and remote assistance operators (as well as their respective client computing devices) may be included in a typical system.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIGS. 4 and 5, and/or may be directly connected to or incorporated into any of the computing devices 110, 410, 420, 430, 440, etc.

Storage system 450 may store various types of information which may be retrieved or otherwise accessed by a server computing device, such as one or more server computing devices 410, in order to perform various actions.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 10:
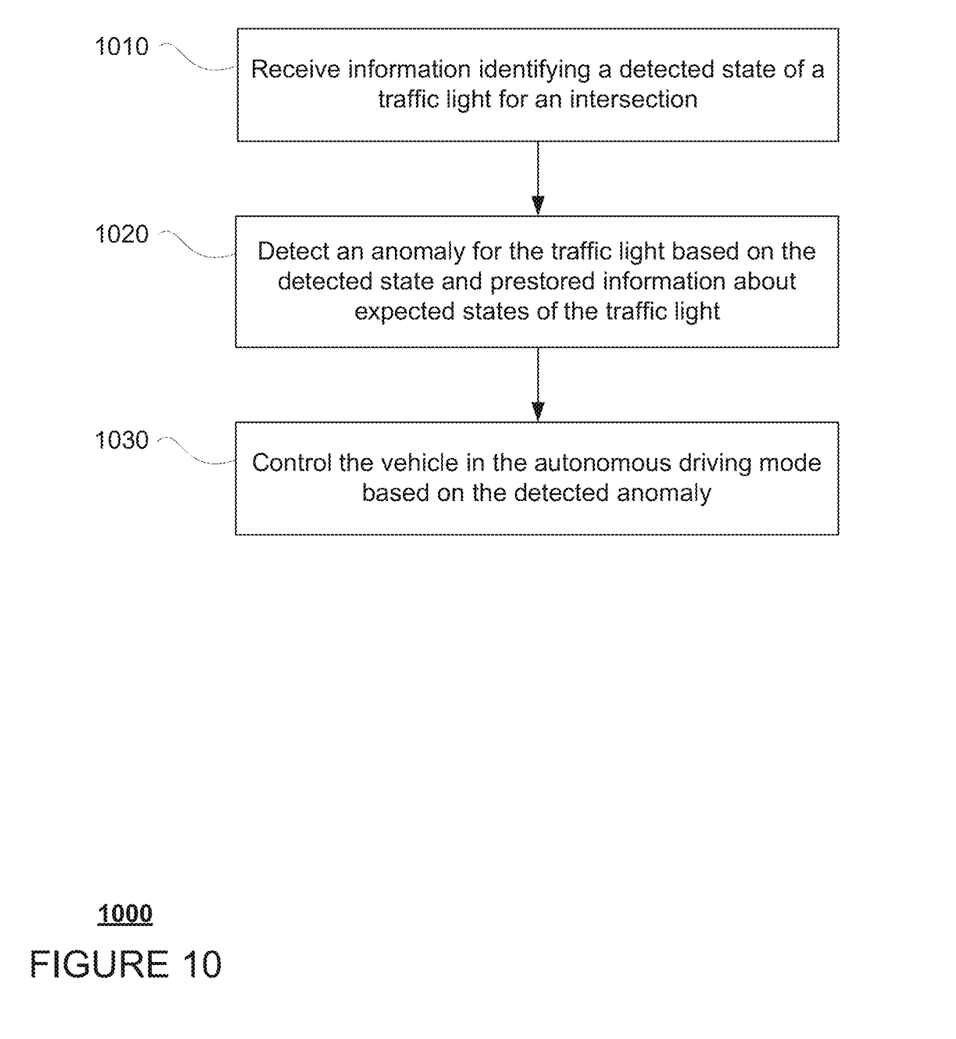
FIG. 10 is an example flow diagram in accordance with aspects of the disclosure.

FIG. 10 includes an example flow diagram 1000 of some of the examples for generating simulated degraded sensor data, which may be performed by one or more processors such as processors 120 of computing devices 110 in order to detect and identify anomalies with traffic signals as well as to control a vehicle in an autonomous driving mode accordingly. For instance, at block 1010, information identifying a detected state of a traffic signal for an intersection is received.

As an autonomous vehicle, such as vehicle 100, drives around in the autonomous driving mode, the vehicle's computing devices 110 and/or perception system 172 may detect and identify the location and state of traffic signals. As noted above, a traffic signal detection system software module may be incorporated into the perception system 172 or the computing devices 110 and may access the map information to determine where the traffic signal detection system software model should expect to perceive traffic signals.

Figure 6:
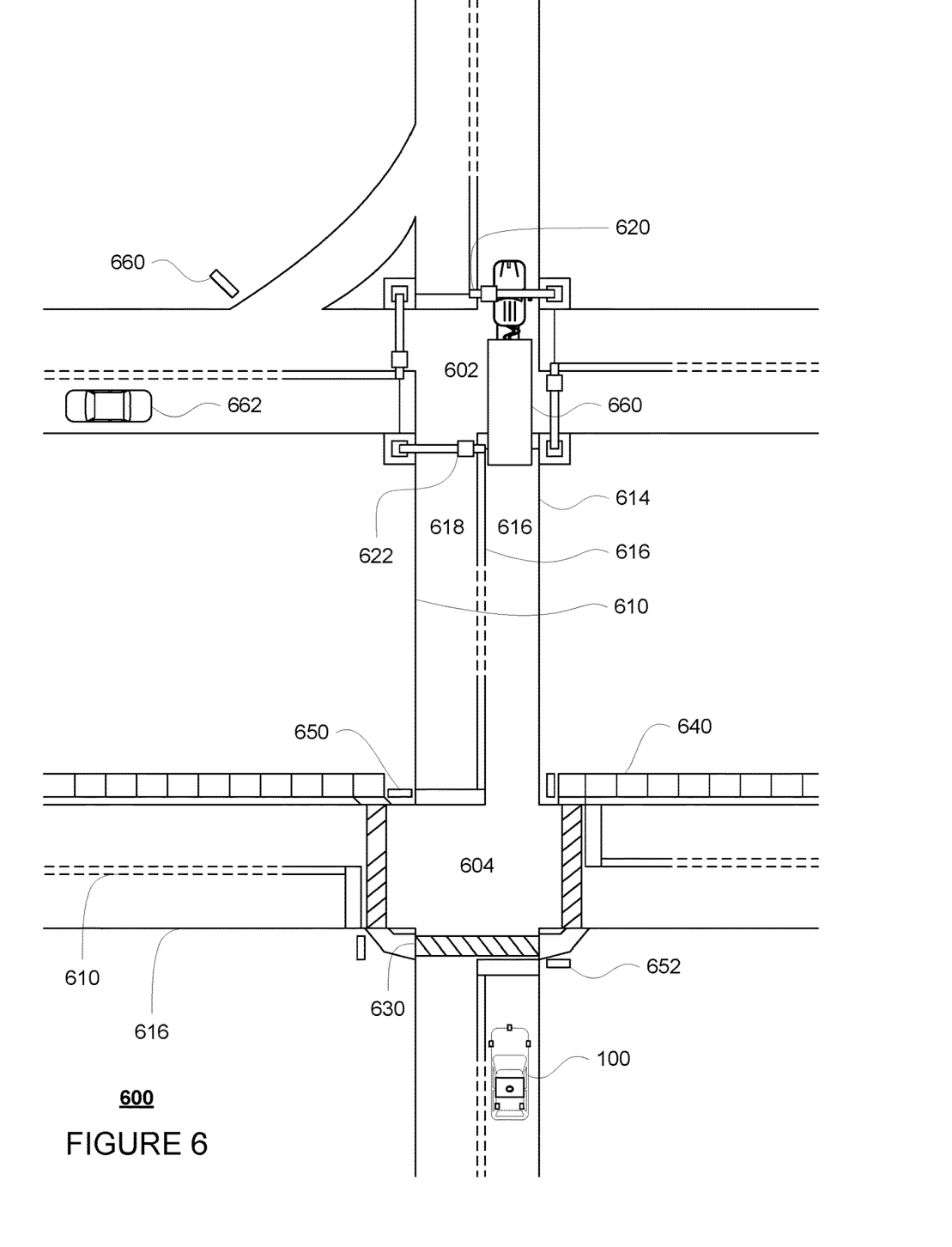
FIG. 6 is an example bird's-eye view of a geographic area in accordance with aspects of the disclosure.
Figure 8:
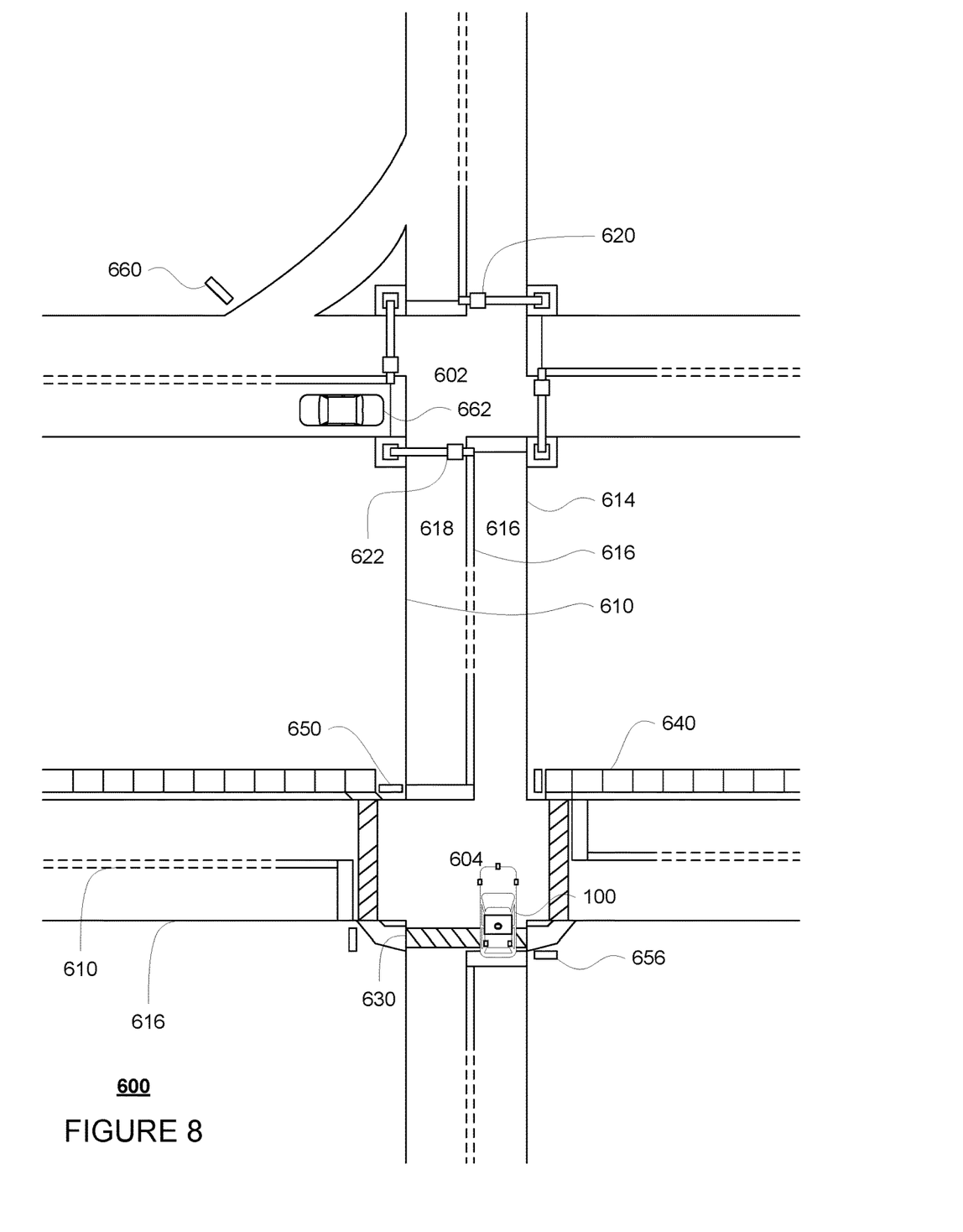
FIG. 8 is an example bird's-eye view of a geographic area in accordance with aspects of the disclosure.

FIGS. 6 and 8 depicts vehicle 100 being maneuvered on a section of roadway 600 including intersections 602 and 604 at two different points in time. In this regard, FIG. 8 occurs later in time than FIG. 6. In these examples, intersections 602 and 604 correspond to intersections 202 and 204 of the map information 200, respectively. In this example, lane lines 610, 612, 614 and lanes 616, 618 correspond to the shape, location, and other characteristics of lane lines 210, 212, 214 and lanes 216, 218, respectively. Similarly, crosswalk 630 corresponds to the shape, location, and other characteristics of crosswalk 230, respectively; sidewalks 640 correspond to sidewalks 240; traffic signals 620, 622 correspond to traffic signals 220, 222, respectively; stop signs 650, 652 correspond to stop signs 250, 252, respectively; and yield sign 660 corresponds to yield sign 260. In this example, vehicle 100 is approaching intersection 602 which is controlled by the traffic signal 620 as indicated in the map information.

The vehicle's computing devices and/or perception system may attempt to identify the state and location of traffic signals along the route. In the example of FIGS. 6 and 8, the vehicle's computing devices 110 and/or the perception system 172 may use the traffic signal detection system software module may be used to attempt to locate traffic signal 220 (corresponding to traffic signal 620) and thereby determine the state of the traffic signal 620.

Figure 7:
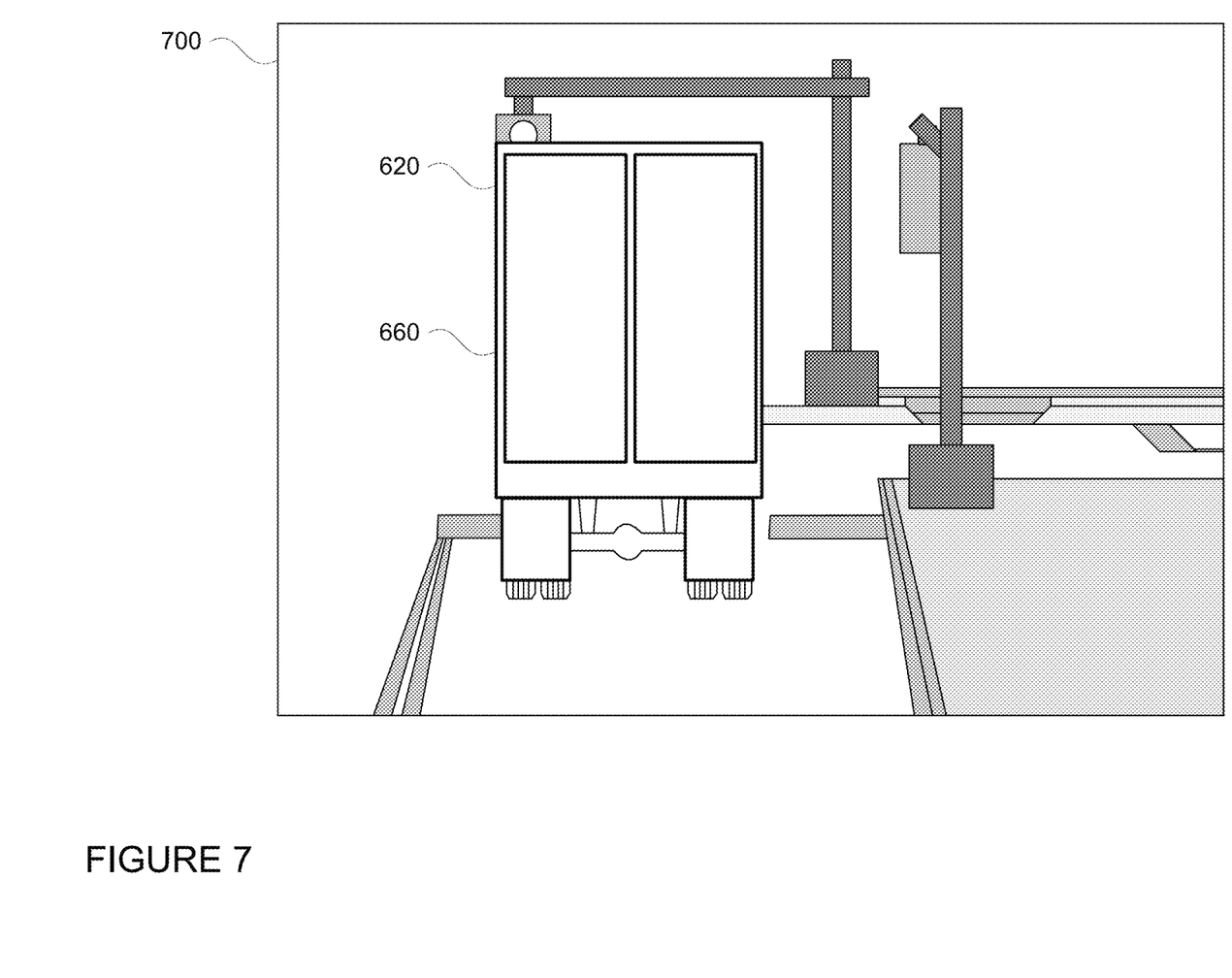
FIG. 7 is an example camera image in accordance with aspects of the disclosure.
Figure 9:
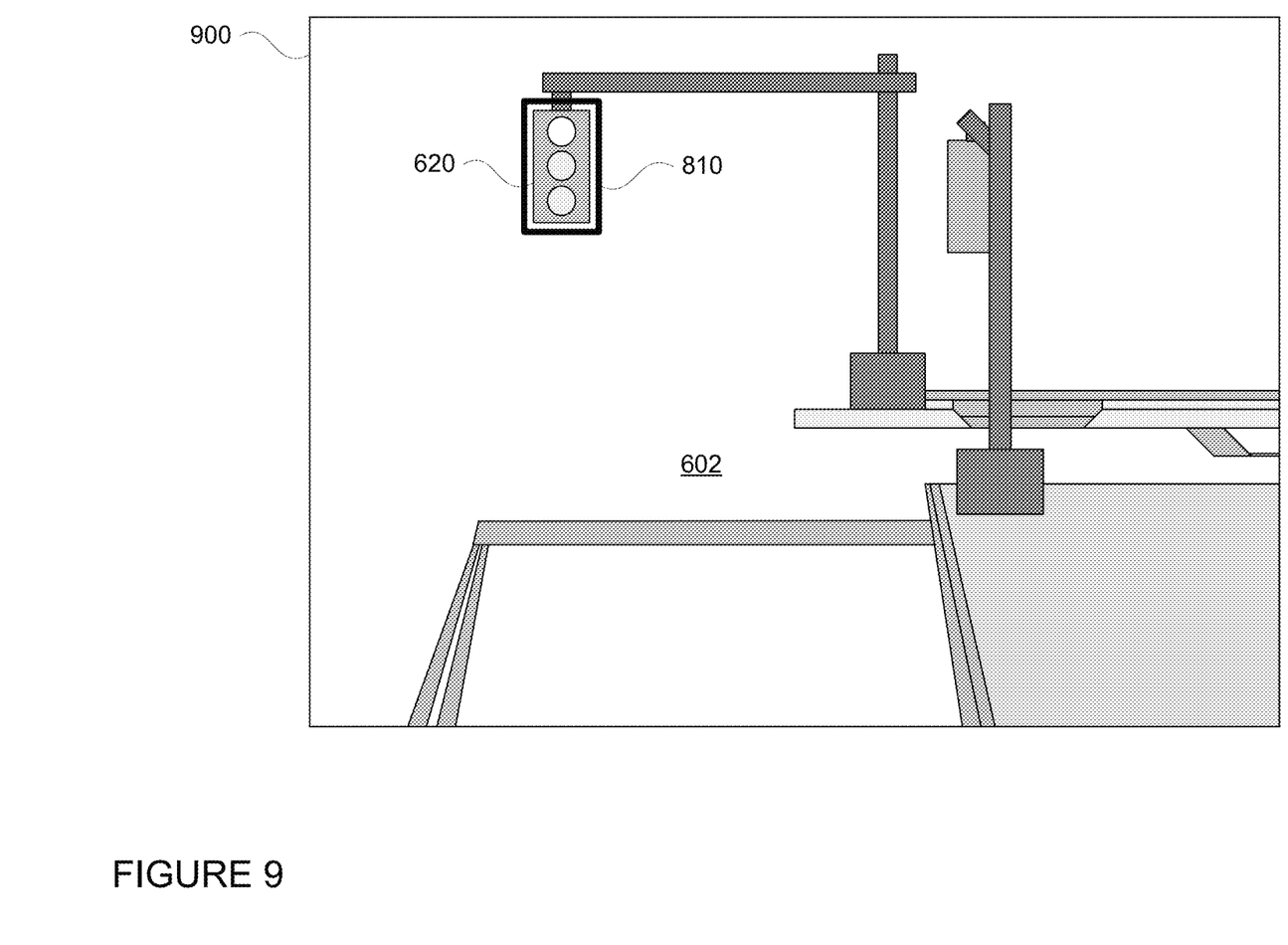
FIG. 9 is an example camera image in accordance with aspects of the disclosure.

As part of this, the perception system 172 may use cameras to capture images of vehicle 100's environment. FIG. 7 is an example camera image 700 captured by a camera of perception system 172 of vehicle 100 as the vehicle approaches intersection 602 from lane 616, for the example of FIG. 6. FIG. 9 is another example camera image 900 captured by a camera of perception system 172 of vehicle 100 as the vehicle approaches intersection 602 from lane 616, for the example of FIG. 8.

These images, as well as other information as described above, may be input into the traffic signal detection system software module in order to determine the state of the traffic signal 620 as well as other information such as its detected three-dimensional location. The state may be any number of different values, including for example, "off", "undetected", "red", "yellow", "green", "flashing red", "flashing yellow", etc. States such as off and undetected may correspond to traffic signals that are occluded (e.g. by another vehicle, a building or other structure, vegetation, weather conditions etc.) or too far from the vehicle to actually determine. This information may be published by the traffic signal detection system software module and made available to the other computing devices and/or systems of the vehicle 100.

For example, turning to FIG. 7, the traffic signal detection system software model may not be able to detect the traffic signal 620 or enough of the traffic signal to determine its state because the traffic signal 620 is partially occluded by another vehicle, here truck 660 (also shown in FIG. 6). In this regard, the traffic signal detection system software module may return a value of "undetected." However, at some point, as shown in FIG. 8, the truck 660 may move out of the way. In this example, the traffic signal detection system software model may detect an area 810 corresponding to the traffic signal 620 as well as a state of the traffic signal, which for the purposes of this example may be any of off, undetected, red, yellow, green, flashing red, flashing yellow, etc.

In order to determine whether a traffic signal is malfunctioning, the computing devices 110 may utilize a plurality of different inputs. Such inputs may include, for example, the detections of traffic signals as published by the traffic signal detection system software module. As noted above, these detections may include the three-dimensional location of the traffic signal as well as a detected state of the traffic signal. In addition to the state and location of a traffic signal, the inputs may also include information about other objects published by the perception system 172. For example, the inputs may include the locations of other vehicles, such as truck 660 and car 662, the paths that such other vehicles have been following over time, as well as the behaviors of those other vehicles. Such behaviors may include how the other vehicle's speed changes over time, whether and when the other vehicle proceeds through an intersection, etc.

Returning to FIG. 10, at block 1020, an anomaly for the traffic signal is detected based on the detected state and prestored information about expected states of the traffic signal. For instance, the aforementioned inputs may be analyzed by the computing devices 110 using a plurality of heuristics or rules in order to detect an anomaly of a traffic signal. A plurality of these heuristics may be analyzed, and if any of them are met, an anomaly may be detected. The heuristics may be analyzed per intersection, per traffic signal, and per control group. A control group may refer to a group of one or more traffic signals that controls one or more lanes. In addition, time-based filtering, both for the current state and previous states, may be applied on a per light basis, and from that combined information, anomalies may be detected.

For instance, an anomaly may be detected by the computing devices 110 when the detected traffic signal state does not correspond to any expected traffic signal states defined in the map information for that traffic signal. For example, if the expected state for traffic signal 220 in the map information is a flashing yellow light, but traffic signal 620 is not yellow or flashing, the computing devices 110 may detect an anomaly based on the camera image 900.

As another instance, an anomaly may be detected by the computing devices 110 when the vehicle is within a threshold distance of a traffic signal where the traffic signal detection system should be able to detect a state of a traffic signal, the state of the the traffic signal is not detected, and there are no apparent occlusions between the vehicle and the traffic signal. In other words, a traffic signal for which a state cannot be observed or determined may be one that is malfunctioning, or one that is simply too far away or occluded by another object. In this regard, if another object, such as another vehicle is creating an occlusion with respect to a traffic signal, and the traffic signal detection system is unable to determine the state of the traffic signal, this would not be an anomaly. Returning to FIG. 6, if vehicle 100 were within the threshold distance of traffic signal 620 (or traffic signal 220 in the map information) when camera image 700 is captured, and the state is determined to be undetected because of the location of vehicle 660, the computing devices 110 would not detect an anomaly. However, returning to FIG. 8, if vehicle 100 were within the threshold distance of traffic signal 620 (or traffic signal 220 in the map information) when camera image 900 is captured, and the state is determined to be undetected, the computing devices 110 would detect an anomaly.

The threshold distance may be determined by collating statistics about when a typical traffic signal should be seen or how long it should take the vehicle's traffic signal detection system to identify the state of the traffic signal (e.g. the expected perceptive range of the perception system 172 and traffic signal detection system software module). To avoid false anomaly detections, this threshold distance may be selected to be a closer distance or time to the traffic signal than the perceptive range.

As another instance, an anomaly may be detected by the computing devices 110 when the vehicle has observed the traffic signal in the same state for longer than a threshold period of time. This threshold period of time may be determined from known estimates for traffic signal lengths of this particular traffic signal or similarly situated traffic signals. To avoid false anomaly detections, this threshold period of time may be determined by adding an amount of time, such as 1-2 seconds or more or less, to the estimates for traffic signal duration for the traffic signal or similarly situated traffic signals. In addition, different threshold periods of time may be used for different states as yellow lights are typically shorter than green lights which are typically shorter than red lights. In addition, if the traffic signal state has been red for longer than the threshold period of time, the behavior of other vehicles as well as other traffic signals (if visible) may inform whether the traffic signal has been red for too long. For example, if cross traffic has proceeded and stopped twice and the vehicle 100 has not detected a green light during that time, this may indicate that there is an anomaly.

Returning to FIG. 10, at block 1030, the vehicle is controlled in the autonomous driving mode based on the detected anomaly. In some instances, an anomaly has been detected, the computing devices 110 may determine a type of the anomaly or rather, classify the anomaly. Again, this classification may be performed using a plurality of heuristics or rules and/or a look up table which cross-references anomalies and classifications and/or responses for the vehicle. In some instances, the classification may be evident from the characteristics of the detected anomaly. For instance, if an anomaly is detected and the traffic signal state is a flashing red light, the detected anomaly may be classified as a flashing red light. Similarly, For instance, if an anomaly is detected and the traffic signal state is a flashing yellow light, the detected anomaly may be classified as a flashing yellow light. As another example, if an anomaly is detected and the traffic signal state is off or unknown, the detected anomaly may be classified as off or unknown. As another example, if an anomaly is detected and the traffic signal state is red or yellow and has been so for too long (i.e. longer than the threshold period of time), the anomaly may be classified as a stuck red or stuck yellow, respectively.

Machine learned models could also more directly go from some of these scenarios to an output, e.g. training a system to directly recognize other vehicles going through a red light, rather than having to explicitly compute that this is happening. As another example, machine learning could be used to predict if the light is 'stuck', based on the expected length of the cycle, observed length so far, cross traffic signals, and behavior of traffic in all directions etc. As a further example, a machine learning model could provide a single probability that the light is behaving anomalously, or it could give a probability for each classification (e.g. stuck, unexpected flashing, off, etc.).

The computing devices 110 may control the vehicle in the autonomous driving mode in order to respond to the anomaly based on the characteristics of the anomaly and/or the classification. For instance, the memory 130 of computing devices 110 may store a mapping of anomaly classifications or characteristics to appropriate vehicle responses in a table or other storage configuration. For example, for an anomaly classified as or which includes the characteristics of a flashing red light, the vehicle's computing devices may treat an intersection for the light as a multi-way stop by stopping at the intersection and waiting for an appropriate time to fit into traffic (if there is cross traffic). In addition, the response may also indicate that the computing devices 110 should attempt to determine whether cross-traffic have a flashing red or yellow light by observe what other vehicles are doing at the intersection, and in particular, whether those other vehicles are stopping before proceeding (which would indicate a flashing red light) or whether those other vehicles are not stopping before proceeding (which would indicate a flashing yellow light). This may be used to better inform when it is appropriate for the vehicle to proceed after stopping at an intersection, such as intersection 602.

For another example, for a detected anomaly classified as or which includes the characteristics of a flashing yellow light, the computing devices 110 may proceed with caution through the intersection without stopping. In this regard, the computing devices 110 may slow the vehicle down dramatically to ensure that the vehicle is visible to any cross-traffic. As another example, if a detected anomaly is classified as or which includes the characteristics of being off or unknown, the computing devices 110 may treat the intersection as a four-way stop (or three-way stop if there are only 3 roads meeting at the intersection). As another example, if a detected anomaly is classified as or which includes the characteristics of being stuck red or stuck yellow, the computing devices 110 may request assistance from a remote assistance operator, such as user 442. The remote assistance operator may simply confirm the state of the traffic signal to the vehicle's computing devices or control the vehicle to make an appropriate maneuver such as to pull over, continue waiting, etc.

In addition to the mapped responses, the computing devices 110 may also utilize the output of other systems of the vehicle 100 to determine how to respond. For instance, the observed behavior of other vehicles can be used as a cue to determine the correct course of action such as in the cross-traffic example discussed above. Additionally, in some cases there may be other forms of dynamic traffic control present that should supersede the normal rules for a detected anomaly. For instance, the output of the detection system software module configured to detect one or more persons directing traffic that detects a pedestrian directing traffic may inform the decision of how to respond. For example, a traffic signal that is malfunctioning and is off or flashing red is normally a multi way stop, but if workers or police are present directing traffic their instructions take precedence over the mapped response. In such cases, the computing devices 110 may attempt to follow instructions from the pedestrian directing traffic.

The vehicle's computing devices may also share the detected anomaly and classification with other vehicles, such as other vehicles of a fleet of autonomous vehicles like vehicle 100A, and/or other remote computing devices, such as the server computing devices 410. As such, the fleet can use this to modify their routing (preferring to route away from this intersection, or at least to not have to turn through it) or they can use it as a prior if they do route to that intersection. In addition, if more than one of these vehicles of the fleet is present at the intersection at the same time, such vehicles can share and/or compare information in order to cross validate one another's detections and classifications, and possibly providing information from multiple vantage points.

The computing devices of the vehicle 100 may utilize the features described herein all of the time, e.g. each time the traffic signal detection system publishes information in order to detect and respond to malfunctioning traffic signals. However, in almost all cases, the traffic signal detection system will be sufficient for the vehicle to be able to respond to traffic signals. But, in the rare case that a traffic signal is malfunctioning, the output of the traffic signal detection system alone may be insufficient to determine how to best control the vehicle. As such, the features described herein may enable autonomous vehicles to detect and respond to malfunctioning traffic signals. This may not only improve safety of the vehicles, but also reduce the likelihood of these vehicles becoming stuck or unable to make forward progress towards their destination.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of controlling a vehicle traveling along a route to a destination in an autonomous driving mode, the method comprising:
receiving, by one or more processors, information identifying a detected state of a traffic signal for an intersection;
detecting, by the one or more processors, an anomaly for the traffic signal based on the detected state and pre-stored information about expected states of the traffic signal;
identifying, by the one or more processors, a classification of the detected anomaly from one of a plurality of different classifications of anomaly types and a probability of the classification; and
controlling, by the one or more processors, the vehicle to make forward progress towards the destination in the autonomous driving mode based on the classification of the detected anomaly.

2. The method of claim 1, wherein the information further identifies a detected location of the traffic signal and wherein detecting the anomaly is further based on the detected location.

3. The method of claim 1, further comprising, receiving information about behavior of another object in an environment of the vehicle, and wherein detecting the anomaly is further based on the behavior.

4. The method of claim 1, wherein detecting the anomaly is further based on whether the vehicle is within a threshold distance of the traffic signal where a state of the traffic signal should be detected.

5. The method of claim 4, wherein detecting the anomaly is further based on a failure to detect the state of the traffic signal when the vehicle is within the threshold distance.

6. The method of claim 5, wherein detecting the anomaly is further based on whether there are occlusions between the vehicle and the traffic signal.

7. The method of claim 5, wherein the threshold distance is closer in distance or time to the traffic signal than a perceptive range of a system of the vehicle configured to detect a state of the traffic signal.

8. The method of claim 1, wherein detecting the anomaly is further based on whether the vehicle has observed a same state of the traffic signal for more than a threshold period of time.

9. The method of claim 8, further comprising, selecting the threshold period of time based on the detected state.

10. The method of claim 1, wherein detecting the anomaly is further based on observed behaviors of other vehicles.

11. The method of claim 1, further comprising:
receiving information about behavior of another object in an environment of the vehicle, wherein the detected anomaly is further classified based on the behavior, and wherein the controlling is further based on the further classification.

12. The method of claim 1, further comprising classifying the anomaly based on whether the vehicle has observed a same state of the traffic signal for more than a threshold period of time, wherein the controlling is further based on the classification.

13. The method of claim 1, wherein controlling the vehicle further includes accessing a mapping of anomaly classifications to vehicle responses and using the classification to determine a response from the mapping.

14. The method of claim 1, wherein controlling the vehicle includes stopping at an intersection controlled by the traffic signal.

15. The method of claim 1, wherein controlling the vehicle includes proceeding through an intersection controlled by the traffic signal without stopping.

16. The method of claim 1, further comprising, observing behavior of cross-traffic, and wherein controlling the vehicle is further based on the observed behavior.

17. The method of claim 1, wherein controlling the vehicle includes requesting assistance from a remote assistance operator before proceeding.

18. The method of claim 1, wherein controlling the vehicle is further based on whether there is a pedestrian directing traffic at an intersection controlled by the traffic signal.

19. The method of claim 1, wherein identifying the classification is based on a look up table which cross-references anomalies and ones of plurality of different types of anomalies.

20. The method of claim 1, wherein the look up table further cross-references the anomalies and the ones of plurality of different classifications of anomaly types with responses, and wherein controlling the vehicle is further based on one of the responses.

21. The method of claim 1, wherein classifying the anomaly includes using a machine learning model to determine the classification and the probability.

* * * * *

UNITED STATES PATENT AND TRADEMARK OFFICE
CERTIFICATE OF CORRECTION

PATENT NO. : 11,866,068 B2
APPLICATION NO. : 16/906594
DATED : January 9, 2024
INVENTOR(S) : David Silver et al.

It is certified that error appears in the above-identified patent and that said Letters Patent is hereby corrected as shown below:

In the Claims

Claim 19, Column 16, Line 48:
Now reads: "ones of plurality"; should read -- ones of the plurality --

Claim 20, Column 16, Line 50:
Now reads: "wherein the look"; should read -- wherein a look --

Claim 20, Column 16, Lines 51 and 52:
Now reads: "ones of plurality"; should read -- ones of the plurality --

Signed and Sealed this
Twentieth Day of February, 2024

Katherine Kelly Vidal
*Director of the United States Patent and Trademark Office*